March 5, 1957
F. DIETZEL
2,784,030
CONCRETE FLOOR WASHER
Filed April 1, 1955
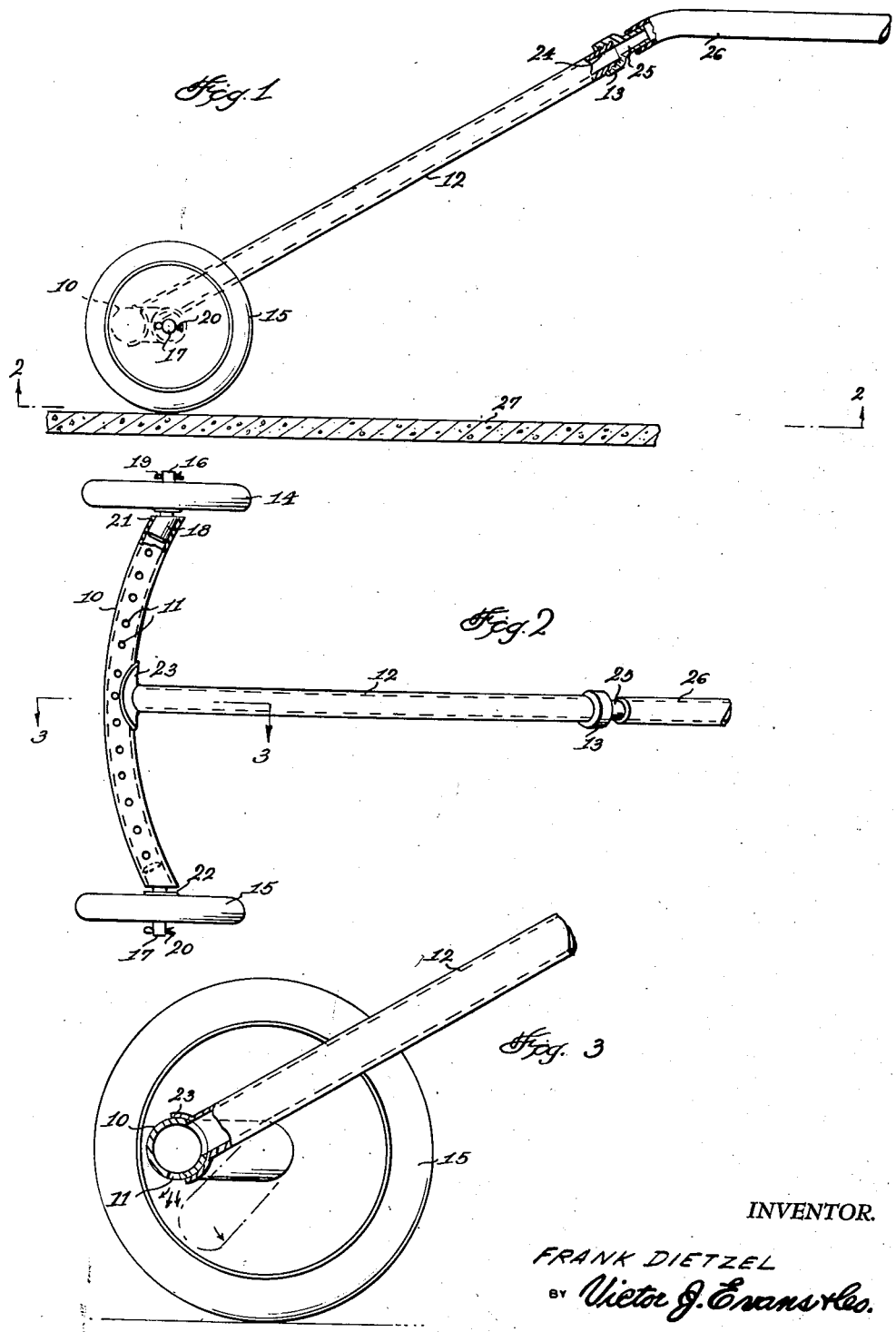
INVENTOR.
FRANK DIETZEL
BY Victor J. Evans & Co.
ATTORNEYS

United States Patent Office 2,784,030
Patented Mar. 5, 1957

2,784,030

CONCRETE FLOOR WASHER

Frank Dietzel, Union City, Tenn.

Application April 1, 1955, Serial No. 498,514

1 Claim. (Cl. 299—47)

This invention relates to floor washing and spraying devices particularly adapted for washing concrete floors and the like, and in particular, a perforated arcuate spray header having wheels rotatably mounted on stub axles at the ends and having a tubular handle extended from the intermediate part whereby with a hose coupling on the extended end of the handle water is adapted to be supplied under pressure from a hose through the handle and through the header whereby the water is sprayed upon a floor or other surface for cleaning the floor or other surface.

The purpose of this invention is to provide an elongated spray header with which water under pressure may be sprayed directly against the surface of a floor or the like.

Various types of washing and cleaning devices have been provided for cleaning concrete and other floors, however, such devices are not adapted to spray water directly against the surface of a floor whereby the floor may be washed and sand, grit, and other dirt readily flushed from the surface thereof.

The object of this invention is, therefore, to provide means for supporting a spray header in spaced relation to a floor or other surface to be cleaned whereby water supplied to the header through a handle thereof is sprayed directly against the surface of the floor.

Another object of the invention is to provide a spray header having a handle extended therefrom in which the header is retained at a constant distance from a surface as water is sprayed from the header upon the surface.

A further object of the invention is to provide a floor washing machine having an arcuate perforated spray header mounted on wheels and having a tubular handle in which the device is of a simple and economical construction.

With these and other objects and advantages in view, the invention embodies a perforated arcuate header having stub axles or shafts carried by plugs secured in ends thereof and a tubular handle having a hose coupling on the extended end secured, such as by welding, to the intermediate part of the header.

Other features and advantages of the invention will appear from the following description, taken in connection with the drawing, wherein:

Figure 1 is a side elevational view of the improved floor washer with part of the handle broken away showing a hose coupling on the extended end thereof.

Figure 2 is a view looking upwardly toward the under surface of the washer with one end of the spray header thereof broken away showing the mounting of one of the wheel axles in the end of the header.

Figure 3 is a cross section through the washer taken on line 3—3 of Figure 2 illustrating the connection of the tubular handle to the spray header, the parts being shown on an enlarged scale.

Referring now to the drawing, wherein like reference characters denote corresponding parts, the improved floor washer of this invention includes an arcuate tube 10 having perforations 11 in the lower surface thereof, a handle 12 having a hose coupling 13 on the extended end and secured to the header 10, such as by welding, and wheels 14 and 15 rotatably mounted on stub shafts or axles 16 and 17, respectively.

The axles 16 and 17, which are in alignment, extend from plugs 18 secured, such as by welding, in the ends of the tube or header 10 and the wheels are retained between fasteners, such as cotter pins 19 and 20, and shoulders 21 and 22 at the ends of the plugs 18.

The lower end of the tubular handle 12 is provided with a flange 23 to facilitate brazing or welding the handle to the header and the opposite or extended end of the handle is provided with threads 24 on which the coupling 13 is threaded. The coupling 13 is provided with an extended nipple 25 over which the end of a hose 26 may be secured by friction or other means.

With the washer positioned on a floor, as indicated by the numeral 27, water sprayed through the perforations 11 impinges upon the surface of the floor and with the header comparatively close to the floor the surface of the floor is thoroughly washed and, by rolling the washer forwardly, material washed from the floor may be flushed into a drain or the like.

Although the washer is disclosed and described as being particularly adapted for use on floors, it will be understood that the washer may be used for cleaning other surfaces.

It will be understood that modifications, within the scope of the appended claim, may be made in the design and arrangement of the parts without departing from the spirit of the invention.

What is claimed is:

In a floor washer, a tube, said tube being provided with a plurality of perforations in its lower surface only, said tube being shaped arcuately, a handle having its longitudinal axis arranged at right angles to said tube, said handle being hollow and being of cylindrical construction, a hose coupling on the outer end of said handle, a plug secured within each end of said tube, said plugs having shoulders on their outer ends, axles extending outwardly from said plugs and said axles being arranged in alignment with respect to each other, wheels arranged on said axles, the lower end of the handle being provided with a flange secured to said tube, the extended end of the handle being arranged in threaded engagement with the coupling, said coupling being provided with an extended nipple for engagement by an end of a hose.

References Cited in the file of this patent

UNITED STATES PATENTS

| | | |
|---|---|---|
| 2,581,678 | Malin | Jan. 8, 1952 |
| 2,638,730 | Davidson | May 19, 1953 |
| 2,692,163 | Geel | Oct. 19, 1954 |